(12) United States Patent
Baumann et al.

(10) Patent No.: US 11,685,135 B2
(45) Date of Patent: Jun. 27, 2023

(54) VEHICLE SANDWICH COMPONENT AND METHOD FOR PRODUCING A VEHICLE SANDWICH COMPONENT

(71) Applicant: Webasto SE, Stockdorf (DE)

(72) Inventors: Matthias Baumann, Stockdorf (DE); Frank Kiesewetter, Stockdorf (DE); Dirk Legler, Stockdorf (DE); Jan Wokoeck, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 328 days.

(21) Appl. No.: 16/640,386

(22) PCT Filed: Aug. 6, 2018

(86) PCT No.: PCT/EP2018/071275
§ 371 (c)(1),
(2) Date: Feb. 20, 2020

(87) PCT Pub. No.: WO2019/042713
PCT Pub. Date: Mar. 7, 2019

(65) Prior Publication Data
US 2020/0361176 A1   Nov. 19, 2020

(30) Foreign Application Priority Data
Aug. 29, 2017 (DE) ............... 10 2017 008 097.6

(51) Int. Cl.
*B32B 3/12* (2006.01)
*B32B 3/02* (2006.01)
(Continued)

(52) U.S. Cl.
CPC ............... *B32B 3/12* (2013.01); *B32B 3/02* (2013.01); *B32B 3/263* (2013.01); *B32B 3/30* (2013.01);
(Continued)

(58) Field of Classification Search
CPC .. B32B 3/26; B32B 3/263; B32B 3/30; B32B 3/12; Y10T 428/24479; Y10T 428/24488;
(Continued)

(56) References Cited

U.S. PATENT DOCUMENTS 4,465,725 A * 8/1984 Riel ................... B32B 27/12
428/116
5,344,280 A * 9/1994 Langenbrunner ..... F01D 21/045
428/116
(Continued)

FOREIGN PATENT DOCUMENTS

DE    102008033923 A1    1/2010
EP        0624459 A2    11/1994
(Continued)

OTHER PUBLICATIONS

International Search Report for PCT/EP2018/071275 dated Nov. 9, 2018 in English and German (19 pages).

*Primary Examiner* — Z. Jim Yang
(74) *Attorney, Agent, or Firm* — Fitch, Even, Tabin & Flannery, LLP

(57) ABSTRACT

A vehicle sandwich component with a layered construction having a honeycomb structure. The honeycomb structure may have a first lower honeycomb layer and a second upper honeycomb layer, the first lower honeycomb layer has at least one edge portion protruding laterally in the transverse direction beyond the second upper honeycomb layer, and a central honeycomb layer region or compression region which has a reduced thickness, achieved by compression, in relation to the edge portion and on which the second upper honeycomb layer is provided. Also, method for producing a vehicle-sandwich component of this type.

8 Claims, 1 Drawing Sheet

Figure 1:
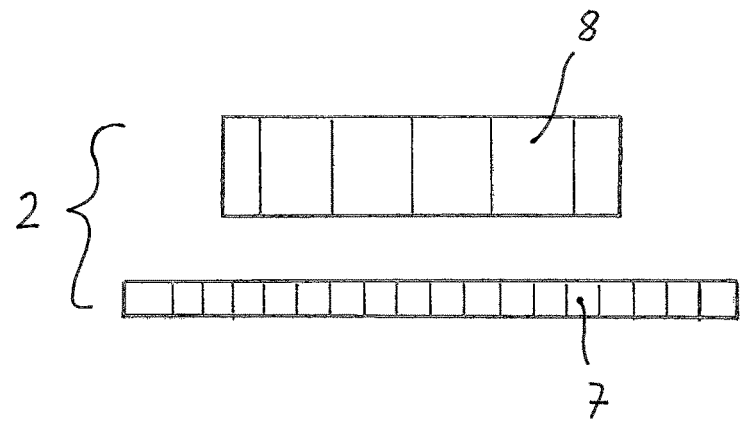

(51) Int. Cl.
   *B32B 3/26* (2006.01)
   *B32B 3/30* (2006.01)
   *B32B 5/02* (2006.01)
   *B32B 7/04* (2019.01)
   *B32B 15/04* (2006.01)
   *B32B 15/092* (2006.01)
   *B32B 15/095* (2006.01)
   *B32B 15/14* (2006.01)
   *B32B 15/20* (2006.01)
   *B32B 27/08* (2006.01)
   *B32B 27/10* (2006.01)
   *B32B 27/12* (2006.01)
   *B32B 27/42* (2006.01)
   *B32B 29/02* (2006.01)
   *B60R 13/02* (2006.01)

(52) U.S. Cl.
   CPC .......... *B32B 5/02* (2013.01); *B32B 7/04* (2013.01); *B32B 15/043* (2013.01); *B32B 15/092* (2013.01); *B32B 15/095* (2013.01); *B32B 15/14* (2013.01); *B32B 15/20* (2013.01); *B32B 27/08* (2013.01); *B32B 27/10* (2013.01); *B32B 27/12* (2013.01); *B32B 27/42* (2013.01); *B32B 29/02* (2013.01); *B32B 2250/40* (2013.01); *B32B 2250/44* (2013.01); *B32B 2260/021* (2013.01); *B32B 2260/046* (2013.01); *B32B 2262/101* (2013.01); *B32B 2262/106* (2013.01); *B32B 2262/108* (2013.01); *B32B 2307/732* (2013.01); *B32B 2435/00* (2013.01); *B32B 2605/08* (2013.01); *B60R 13/0212* (2013.01)

(58) Field of Classification Search
   CPC ..... Y10T 428/24521; Y10T 428/24537; Y10T 428/24545; Y10T 428/2457; Y10T 428/24587; Y10T 428/24595; Y10T 428/24603; Y10T 428/24612; Y10T 428/24149–24165; Y10T 428/24661; Y10T 428/236; B29L 2031/60; B29L 2031/608; B29D 99/0089; B29C 66/7252–7254
   See application file for complete search history.

(56) References Cited

U.S. PATENT DOCUMENTS

| | | | |
|---|---|---|---|
| 2005/0278860 A1* | 12/2005 | Landi | A47C 27/144 5/710 |
| 2009/0297763 A1* | 12/2009 | Ross | B32B 3/263 428/116 |
| 2011/0101731 A1 | 5/2011 | Legler et al. | |
| 2011/0300329 A1* | 12/2011 | Kowalski | E04C 2/365 428/116 |
| 2012/0094061 A1* | 4/2012 | Diderich | B65D 81/127 428/116 |
| 2014/0154460 A1* | 6/2014 | Preisler | B60R 13/0275 428/116 |
| 2015/0273787 A1* | 10/2015 | Nansen | E04C 2/365 29/897 |
| 2015/0273789 A1* | 10/2015 | Ginovski | B32B 37/1054 428/116 |
| 2016/0123524 A1* | 5/2016 | Burkhard | F16M 13/00 29/446 |
| 2017/0061949 A1* | 3/2017 | Ayres | E04B 1/86 |
| 2017/0173935 A1* | 6/2017 | Fukushima | B32B 27/08 |
| 2017/0282484 A1* | 10/2017 | Dietz | B32B 37/1284 |
| 2019/0118486 A1* | 4/2019 | Compton | B29C 64/10 |
| 2019/0180729 A1* | 6/2019 | Weston | B32B 27/12 |
| 2019/0329637 A1* | 10/2019 | Baumann | B60J 7/12 |
| 2020/0062320 A1* | 2/2020 | Robinson | B62D 29/043 |
| 2020/0139664 A1* | 5/2020 | Ohara | B32B 3/263 |

FOREIGN PATENT DOCUMENTS

| | | | |
|---|---|---|---|
| EP | 894611 B1 * | 1/2003 | B29C 53/04 |
| EP | 3037601 A1 | 6/2016 | |
| WO | 2007071929 A1 | 6/2007 | |

\* cited by examiner

VEHICLE SANDWICH COMPONENT AND METHOD FOR PRODUCING A VEHICLE SANDWICH COMPONENT

CROSS-REFERENCE TO RELATED APPLICATIONS

This application is a U.S. national phase application filed under 35 U.S.C. § 371 of
International Application No. PCT/EP2018/071275, filed 6 Aug. 2018, designating the United States, which claims priority from German Patent Application No. 10 2017 008 097.6, filed 29 Aug. 2017, which are hereby incorporated herein by reference in their entirety for all purposes.

FIELD

The invention relates to a vehicle sandwich component having a layer construction which has a honeycomb structure, and to a method for producing a vehicle sandwich component.

BACKGROUND

A vehicle sandwich component of this type is, for example, a cover of a roof opening system such as a sunroof or a spoiler roof, a surface component of a roof module, a trim component of a vehicle or else a parcel shelf or a sunroof liner.

Sandwich components in automotive construction are usually configured as flat components with a uniform component thickness. This applies, in particular, to components such as parcel shelves, sunroof liners or entire vehicle roofs. A core structure of said components is manufactured by means of a homogeneous honeycomb core with a constant honeycomb thickness. For components with elevated strength requirements or contours which are defined by design, such as cabriolet roof bows which have great differences in thickness, honeycombs with a constant thickness cannot be used. Particularly thin cross sections are required specifically in the component edge region, whereas great thicknesses are required in the inner region of the component. Accordingly, the honeycombs have to be machined in a complicated manner, since otherwise there is the risk that the honeycomb parts which are compressed in the method can swell in the edge region on account of excessively low plastic penetration, in particular as a result of the action of moisture.

EP 3 037 601 A1 has disclosed a honeycomb core construction and a sandwich component having a honeycomb core construction of this type with two honeycomb cores or honeycomb layers. The two honeycomb cores have a connecting layer which is arranged between the two honeycomb cores and has adhesive for connection to the honeycomb cores merely in the region of the webs of the honeycomb cores. Said honeycomb core construction is pressed to shape to form a sandwich component with covering layers which are applied on one side or on both sides in a compression mold.

SUMMARY

The invention is based on the object of providing a vehicle sandwich component mentioned at the outset which is improved with regard to its production complexity, and of providing a method for producing a vehicle sandwich component of this type.

In the case of the vehicle sandwich component mentioned at the outset, said object is achieved according to the invention by virtue of the fact that the honeycomb structure has a first lower honeycomb layer and a second upper honeycomb layer, and that the first lower honeycomb layer has at least one edge section which protrudes laterally beyond the second upper honeycomb layer in the transverse direction, and a central honeycomb layer region or compression region which has a thickness reduced by way of compression relative to the edge section and on which the second upper honeycomb layer is arranged.

Furthermore, the object is achieved by way of a method having the features of claim 7.

Advantageous refinements of the invention are specified in each case in the dependent claims.

In the case of the proposed vehicle sandwich component, the honeycomb structure can be produced with different thicknesses, for example in the central region in comparison with an edge section, in an inexpensive way without machining of the honeycomb layers. Here, fundamentally that honeycomb layer which has a lower compressive rigidity can be reduced to the desired thickness by means of an independent deformation or pressing operation in the provided compression region, before the two honeycomb layers are connected to one another in order to form the honeycomb structure. It is particularly preferred, however, if the two honeycomb layers which are not yet deformed are held in a mold or compression mold such that they are positioned on one another in the desired mutual orientation, and the more compressively rigid honeycomb layer is pressed into the less compressively rigid honeycomb layer by way of pressing pressure, with the result that the less compressively rigid honeycomb layer is compressed to the desired reduced thickness in the bearing region of the more compressively rigid honeycomb layer. Here, at least one edge section of the less compressively rigid honeycomb layer is not compressed or is compressed merely slightly, and is possibly adapted only in its outer contour to the desired shape of the sandwich component and, for example, is beveled toward the edge.

The thickness of the respective honeycomb layer and its compressive rigidity are selected in a manner which is dependent on the sandwich component to be produced. The compressive rigidity of each of the two honeycomb layers can be set, for example, by way of the use of different honeycomb materials and honeycomb constructions, smaller paper thicknesses or different paper types in the case of paper honeycombs or, for example, by way of the use of different honeycomb adhesives.

The two honeycomb layers are called the first honeycomb layer and the second honeycomb layer, and, depending on the respective positions with respect to one another in a compression mold or in a later installed position of the vehicle sandwich component, can also be called the lower honeycomb layer and the upper honeycomb layer, said position indications accordingly being exchangeable.

It is provided in accordance with one particularly preferred design that the upper or more compressively rigid honeycomb layer has a common contact or bearing face with the lower or less compressively rigid honeycomb layer in the central compression or honeycomb layer region. In order to connect the two honeycomb layers, it can be provided that a plastic, such as polyurethane, of a lower plastic layer which is, in particular, fiber-reinforced and forms a covering layer on the lower or less compressively rigid honeycomb layer extends through the central compression or honeycomb layer region of the lower honeycomb layer, and forms a fixed connection to the upper honeycomb layer, said adhesive layer expediently penetrating into said non-deformed honeycomb layer only in a thin contact region. An additional fastening means is therefore not required. The fixed plastic connection prevents a resilient yielding movement of the honeycomb structure of the sandwich component under loading. Non-deformed regions of the more compressively rigid honeycomb layer should not be stiffened by the plastic for reasons of weight saving of said sandwich component which represents a lightweight component.

A lower plastic layer which is, in particular, fiber-reinforced expediently forms a lower or inner-side covering layer, and an upper plastic layer which is, in particular, fiber-reinforced forms an upper or outer-side covering layer of the sandwich component.

The edge section of the sandwich, component, which edge section is formed with a reduced thickness in comparison with the central region of the sandwich component, is formed circumferentially or at least in one or more sections on the sandwich component.

By way of a method according to the invention as claimed in claim 7, a particularly light and nevertheless strong vehicle sandwich component can be produced with different component thicknesses by way of forming processes without machining, as described in the preceding text. In the case of a method for producing a vehicle sandwich component having a layer construction with a honeycomb structure and a first or inner covering layer, two honeycomb layers consisting of honeycomb materials with different compressive rigidities are pressed against one another in a compression mold, and the second more compressively rigid honeycomb layer compresses the first less compressively rigid honeycomb layer in the region of the common bearing face in a compression or honeycomb layer region to a reduced thickness in the process. Furthermore, a plastic of an outer plastic layer which is, in particular, fiber-reinforced and forms the covering layer on the compressed honeycomb layer penetrates through the compression or honeycomb layer region of the first compressed honeycomb layer and forms a fixed connection to the other second honeycomb layer.

It can preferably be provided here in the case of said method that the sandwich component is produced with at least one edge section which is formed in the first less compressively rigid honeycomb layer outside its compression or honeycomb layer region and outside the other second more compressively rigid honeycomb layer.

A second or outer covering layer is expediently applied to the honeycomb structure.

The above-described method for producing a vehicle sandwich component as claimed in one of claims 1 to 6 is expediently provided in accordance with the preceding explanations.

BRIEF DESCRIPTIONS OF THE DRAWINGS

Figure 2:
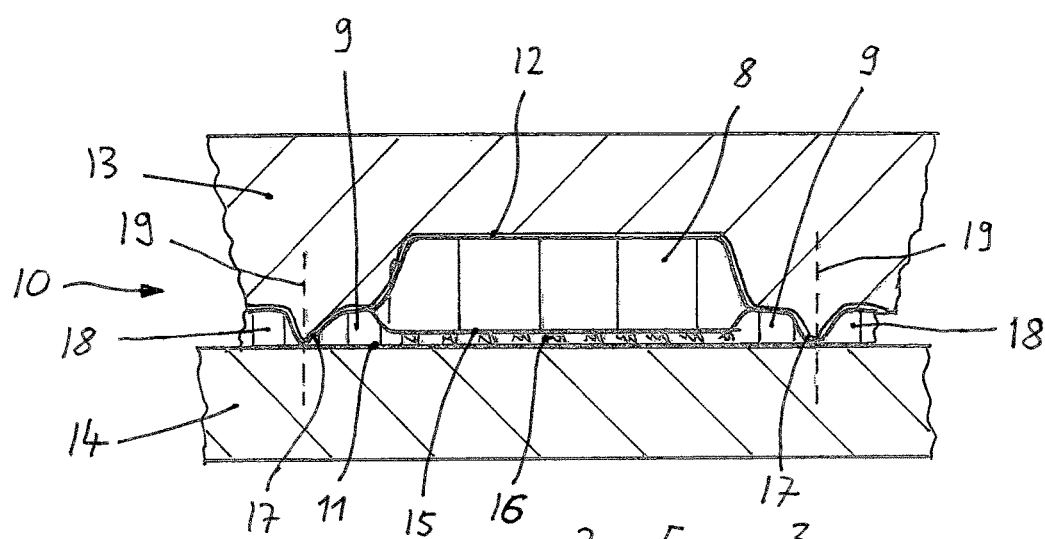
Figure 3:
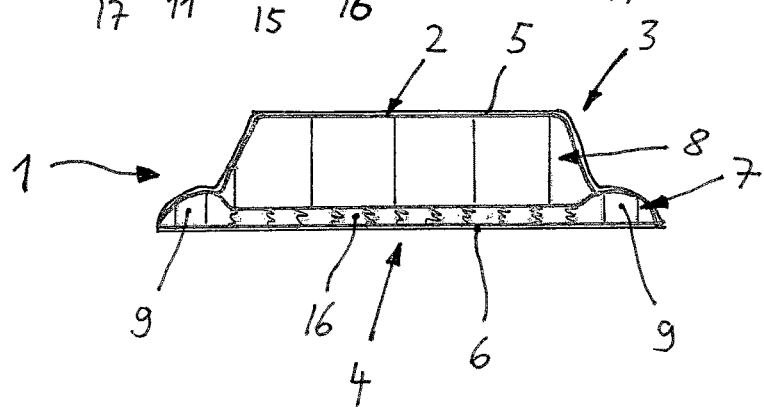

In the following text, the invention will be described in greater detail on the basis of one exemplary embodiment of a vehicle sandwich component according to the invention with reference to the drawing, in which:

FIG. 1 shows a sectional view of two honeycomb layer parts for producing a honeycomb structure of a sandwich component, FIG. 2 shows a sectional view of a mold with two closed mold halves and a deformed honeycomb structure with two covering layers which is arranged therein, and FIG. 3 shows a sectional view of a finished sandwich component.

DETAILED DESCRIPTION

A sandwich component 1 (see FIG. 3) of a vehicle, such as a part of a roof module or a cover of a roof which can be opened such as a sunroof or tilting/sliding roof or the like, has a layer construction with a central honeycomb structure 2 as core layer and with covering layers 5 and 6 which are applied on both sides or on the outer side 3 and on the inner side 4 of the sandwich component 1.

The honeycomb structure 2 comprises a first honeycomb layer 7 and a second honeycomb layer 8. The first honeycomb layer 7 which is shown as the lower part in FIG. 1 and forms the inner-side lower honeycomb layer 7 in the sandwich component 1 is formed with a greater area than the second honeycomb layer 8 which is shown as the upper part in FIG. 1 and forms the outer-side upper honeycomb layer 8 in the sandwich component 1. The first lower honeycomb layer 7 has a thickness which is, in particular, homogeneous and is smaller than the thickness of the second upper honeycomb layer 8. The first lower honeycomb layer 7 has a compressive rigidity which is lower than the compressive rigidity of the second upper honeycomb layer 8. The compressive rigidity denotes the rigidity or strength of the honeycombs or the honeycomb layers 7 and 8 against compressing deformation with loading of a compression mold.

For the production of the honeycomb structure 2, the two honeycomb layers 7 and 8 are placed onto one another in such a way that the first lower honeycomb layer 7 projects with lateral edge sections 9 laterally beyond the second upper honeycomb layer 8. The two honeycomb layers 7 and 8 are fixed on one another such that they can be handled, for example by means of clips, spray adhesive or double-sided adhesive tape or the like. The strength of the fixing is to be sufficient for handling the honeycomb layers 7 and 8 which are connected to one another before and during insertion into a compression mold; a higher connecting strength is therefore not required.

The two honeycomb layers 7 and 8 which are connected to one another are placed into a cavity of a mold or compression mold 10 between an inner or lower fiber-reinforced plastic layer 11 and an outer or upper fiber-reinforced plastic layer 12. The two plastic layers 11 and 12 are inserted, for example, as layers or are sprayed in with a spraying tool, the plastic material being, for example, fiber-reinforced polyurethane or an epoxy resin. In the case of closure of the compression mold 10, the upper compression mold half 13 which substantially comprises the shaping cavity presses the second upper honeycomb layer 8 against the first lower honeycomb layer 7 which, with the lower plastic layer 11 being positioned in between, bears against the lower compression mold half 14 which has, for example, a planar pressing face, and collapses and is compressed in the process on account of its lower compressive rigidity in the region of a bearing face 15 of the upper honeycomb layer 8, whereas the second upper honeycomb layer 8 substantially maintains its thickness on account of its higher compressive rigidity. The first lower honeycomb layer 7 therefore has a central deformed deformation or compression region 16 with a reduced thickness, and the edge sections 9 which are situated outside the central compressed honeycomb layer region or compression region 16 and the upper honeycomb layer 8, have substantially maintained their original thickness, and have received their shape which is provided for the sandwich component 1 by way of the shaping substantially of the upper compression mold half 13. The upper compression mold half 13 comprises, for example, shaping which is such that the respective edge section 9 is pressed on its outer edge into a thin web 17, on which projecting parts 18 of the sandwich component 1 which is produced in the compression mold 10 can be severed. Dividing lines 19 for showing exemplary positions for severed portions are indicated by way of dashed lines in FIG. 2.

The compressive rigidity of each of the two honeycomb layers 7 and 8 can be set, for example, by way of the use of different honeycomb materials, smaller paper thicknesses or different paper types in the case of paper honeycombs or, for example, by way of the use of different honeycomb adhesives. The thickness or height of the first lower honeycomb layer 7 or its honeycombs corresponds to the maximum thickness of the sandwich component 1 in its edge sections 9, or is merely slightly greater and is compressed to the desired thickness during pressing. The second upper honeycomb layer 8 comprises only the core region of the sandwich component 1, which core region is formed with a double-layer honeycomb structure 2 in comparison with the edge sections 9. In a manner which is dependent on the degree of compression of the central part or compression region 16 of the lower honeycomb layer 7, the maximum thickness of the second upper honeycomb layer 8 corresponds at most substantially to the greatest component height of the sandwich component 1, or it is correspondingly smaller on account of the thickness of the central part of the lower honeycomb layer 7.

In the case of said composite production process for producing the sandwich component 1, the two honeycomb layers 7 and 8, embedded between the two fiber-reinforced plastic layers 11 and 12, are therefore stamped into the desired shape, the two plastic layers 11 and 12 forming the two covering layers 5 and 6 in the case of the finished sandwich component 1. During the pressing operation, the lower less compressively rigid honeycomb layer 7 collapses first of all. As a result, the honeycomb thickness of the lower first honeycomb layer 7 is reduced greatly in the inner region of the sandwich component 1, and the plastic of the fiber-reinforced plastic layers 11 and 12, which plastic bonds the fibers of the fiber reinforcement to the outer sides or outer faces of the honeycomb layers 7 and 8, can penetrate from the plastic layer 11 through the first lower honeycomb layer 7 as far as the second upper honeycomb layer 8 into the honeycomb core structure of the sandwich component 1. The curing plastic which then encloses the two honeycomb layers 7 and 8 on their common contact or bearing face 15 holds the two honeycomb layers 7 and 8 together fixedly. Said fixed connection rules out a spring effect between the two honeycomb layers 7 and 8 and provides a dimensionally stable honeycomb structure 2.

The thicknesses of the two covering layers, for example from 0.5 mm to 1.0 mm, are to be taken into consideration during the selection and design of the honeycomb layers 7 and 8. Further covering layers can also fundamentally be applied in the compression mold 10 (for example, as an In Mold Coat layer or IMC layer) or subsequently outside the compression mold 10.

The reinforcing fibers can be, for example, basalt fibers, carbon fibers, natural fibers or glass fibers.

The honeycombs of the honeycomb layers are preferably produced from paper, from aluminum or from a plastic such as phenolic resin. Honeycombs are also understood to mean, for example, components which run in an undulating manner or spacer parts which run perpendicularly with respect to the outer faces of the honeycomb layer, or cell-like structures.

The directional indications "upper", "lower", "outer" and "inner" which are contained in the above description relate merely to the illustration of the exemplary embodiment in the figures and do not restrict, for example, the arrangement of the two honeycomb layers 7 and 8, with the result that the more compressively rigid honeycomb layer 8 can also assume a lower or inner position in the honeycomb structure and the sandwich component 1.

The demolding of the sandwich component 1 from the mold or compression mold is possibly followed by further method steps, such as trimming or cutting to size of the edges or borders of the sandwich component 1.

The individual features of the invention which are disclosed in the description, on the basis of the exemplary embodiment and in the figures can be combined with the subject matter of the invention in its general form in any desired technically expedient arrangements and designs.

LIST OF DESIGNATIONS

1 Sandwich component
2 Honeycomb structure
3 Outer side
4 Inner side
5 Covering layer
6 Covering layer
7 First honeycomb layer
8 Second honeycomb layer
9 Edge section
10 Compression mold
11 Inner plastic layer
12 Outer plastic layer
13 Upper compression mold half
14 Lower compression mold half
15 Bearing face
16 Compression region
17 Web
18 Part
19 Dividing line

The invention claimed is:
1. A vehicle sandwich component having:
a layer construction which has a honeycomb structure wherein, the honeycomb structure has a first lower honeycomb layer and a second upper honeycomb layer, and
wherein the first lower honeycomb layer has at least one edge section which protrudes laterally beyond the second upper honeycomb layer in the transverse direction, and a central honeycomb layer region or compression region which has a thickness reduced by way of compression relative to the edge section and on which the second upper honeycomb layer is arranged;
wherein the honeycomb structure additionally has a lower plastic layer which is fiber-reinforced, the lower plastic layer forms a covering layer and is located adjacent a lower surface of the first lower honeycomb layer, the lower surface of the first lower honeycomb layer opposing a surface of the first lower honeycomb layer upon which the second upper honeycomb layer is located, and
wherein a plastic of the lower plastic layer extends through the central compression or central honeycomb layer region of the first lower honeycomb layer and forms a fixed connection to the second upper honeycomb layer.

2. The vehicle sandwich component of claim 1, wherein the first lower honeycomb layer has a compressive rigidity which is lower than the compressive rigidity of the second upper honeycomb layer.

3. The vehicle sandwich component of claim 1, wherein the second upper honeycomb layer has a common contact or bearing face with the first lower honeycomb layer in the central compression or honeycomb layer region.

4. The vehicle sandwich component of claim 1, wherein the plastic of a lower plastic layer which is fiber-reinforced forms a lower or inner-side covering layer, and an upper plastic layer which is fiber-reinforced forms an upper or outer-side covering layer of the sandwich component.

5. The vehicle sandwich component of claim 1, wherein the at least one edge section is formed with a thickness reduced by way of compression and extends on the edge of the sandwich component circumferentially or at least in sections.

6. A method for producing the vehicle sandwich component as claimed in claim 1, the method comprising the steps of:

pressing the honeycomb layers having different compressive rigidities against one another in a compression mold, and the second more compressively rigid honeycomb layer compressing the first less compressively rigid honeycomb layer in a region of a common bearing face in a compression or honeycomb layer region to a reduced thickness in the process, the plastic of an outer plastic layer which is fiber-reinforced and forms the covering layer on the compressed honeycomb layer penetrating through the compression or honeycomb layer region of the first compressed honeycomb layer and forming a fixed connection to the other second honeycomb layer.

7. The method of claim 6, wherein the sandwich component is produced with at least one edge section which is formed in the first less compressively rigid honeycomb layer outside its compression or honeycomb layer region and outside the other second more compressively rigid honeycomb layer.

8. The method of claim 6, wherein a second or outer covering layer is applied to the honeycomb structure.

* * * * *